United States Patent
Jung et al.

(10) Patent No.: US 12,292,296 B2
(45) Date of Patent: May 6, 2025

(54) SYSTEM FOR GENERATING AUTONOMOUS DRIVING PATH USING HARSH ENVIRONMENT INFORMATION OF HIGH DEFINITION MAP AND METHOD THEREOF

(71) Applicant: INAVI SYSTEMS CORP., Gyeonggi-do (KR)

(72) Inventors: Han Soo Jung, Gyeonggi-do (KR); Seung Ho Yoon, Gyeonggi-do (KR)

(73) Assignee: INAVI SYSTEMS CORP., Gyeonggi-do (KR)

( * ) Notice: Subject to any disclaimer, the term of this patent is extended or adjusted under 35 U.S.C. 154(b) by 202 days.

(21) Appl. No.: 18/085,148

(22) Filed: Dec. 20, 2022

(65) Prior Publication Data

US 2023/0204368 A1    Jun. 29, 2023

(30) Foreign Application Priority Data

Dec. 23, 2021    (KR) .................. 10-2021-0185908

(51) Int. Cl.
*G01C 21/34*    (2006.01)
*B60W 60/00*    (2020.01)

(52) U.S. Cl.
CPC ....... *G01C 21/3461* (2013.01); *B60W 60/001* (2020.02)

(58) Field of Classification Search
CPC ............... G01C 21/34; G01C 21/3415; G01C 21/3446; G01C 21/3461; G01C 21/3492; G01C 21/343; G01C 21/3691; G01C 21/38; G01C 21/387; G01C 21/3874; G01C 21/3896; B60W 60/0011; B60W 60/001; B60W 60/0021; B60W 60/0015;
(Continued)

(56) References Cited

U.S. PATENT DOCUMENTS 11,801,864 B1 * 10/2023 Arora ..................... G06N 3/084
2004/0158393 A1 * 8/2004 Oonishi ............. G01C 21/3461
340/995.23
(Continued)

FOREIGN PATENT DOCUMENTS

JP    2016-133328 A    7/2016
KR    10-2011-0061374 A    6/2011
(Continued)

*Primary Examiner* — Russell Frejd
*Assistant Examiner* — Brandon Z Willis
(74) *Attorney, Agent, or Firm* — Studebaker Brackett PLLC

(57) ABSTRACT

A system for generating an autonomous driving path using harsh environment information of an high definition map, includes: a search extension determination unit including a data storage unit for storing data having high definition map data and autonomous vehicle information as data used for autonomous driving, and a search extension module that performs network search extension processing in the direction of tracking a road with a low search cost and avoiding harsh environment conditions; a search information generation unit for generating search extension information according to the performance of the search extension module; and a search result generation unit configured to generate an autonomous driving path based on the search extension information.

5 Claims, 3 Drawing Sheets

(58) Field of Classification Search
CPC ......... B60W 2552/05; B60W 2552/35; B60W 2555/20; G05D 2107/13; G05D 1/0088; G05D 1/0055; G05D 1/0212; G05D 1/0214; G05D 1/0268; G05D 1/0274; G06Q 10/047; G06Q 50/40

See application file for complete search history.

(56) References Cited

U.S. PATENT DOCUMENTS

| | | | | |
|---|---|---|---|---|
| 2017/0010613 | A1* | 1/2017 | Fukumoto | G08G 1/096844 |
| 2018/0136662 | A1* | 5/2018 | Kim | G05D 1/0214 |
| 2020/0353949 | A1* | 11/2020 | Huang | G01C 21/3691 |
| 2022/0340138 | A1* | 10/2022 | Seegmiller | B60W 30/045 |
| 2022/0402521 | A1* | 12/2022 | Hetang | B60W 60/0011 |

FOREIGN PATENT DOCUMENTS

| | | |
|---|---|---|
| KR | 1020150086065 | 5/2015 |
| KR | 10-2015-0131348 A | 11/2015 |
| KR | 1020180040787 | 4/2018 |

\* cited by examiner

SYSTEM FOR GENERATING AUTONOMOUS DRIVING PATH USING HARSH ENVIRONMENT INFORMATION OF HIGH DEFINITION MAP AND METHOD THEREOF

BACKGROUND

The present invention relates to a system for generating an autonomous driving path and a method thereof, and more particularly, to a system for generating an autonomous driving path using harsh environment information of an high definition map and a method thereof capable of using information corresponding to harsh environment conditions in high definition map information to avoid harsh environment conditions in advance, so that it can be reflected in a path generation result.

An autonomous driving vehicle is a vehicle that can drive itself without an intervention of a driver or a passenger. The technologies of the autonomous driving are divided into five stages depending on the stage of development. A level 3 of the five stages of the autonomous driving is a "conditional automation" stage in which the autonomous driving system drives the vehicle, but the driver should control the vehicle in case of an emergency. A level 4 is a stage in that the vehicle itself judges the situation and the intervention of the driver is not required even in an emergency. That is, the level 4 or higher is recognized as a fully autonomous driving level.

For the autonomous driving in the level 4, it is essential to provide a path that is used for autonomous driving operation by utilizing maps for navigation, high definition map data, and autonomous vehicle information.

Also, in this path generation for autonomous driving, it is desirable to provide results that reflects the additional considerations such as lane change or turning radius, so that there are no obstacles in the autonomous driving, unlike path generation for general vehicle driving.

On the other hand, if there are multiple paths available for driving, it is important to set the optimal path considering autonomous driving. In relation to such optimal path setting, Korean Patent Registration No. 10-1907268 proposes a technology in that the driving is performed by selecting an optimal path between the first driving path based on the surrounding environment recognition and the second driving path based on the map database.

In the meantime, Korean Patent Registration No. 10-1581286 discloses a technique on a path tracking method includes the steps of: generating a true path by compensating the path points of a global path provided in advance with secondary compensation points; generating a reference path parallel to the true path by using the current location of the vehicle; generating one or more candidate paths by using the current location of the vehicle as a starting point and generating virtual path points in the number of the reference points in the reference path; inspecting whether an obstacle can interfere the generated candidate paths and modifying the candidate paths when there is no presence of such obstacle; and selecting the optimal path from the modified candidate paths based on the elapsed time and the index of a target point.

For safe operation in the high-level autonomous driving such as level 4, it is required to bypass or avoid sections that contain harsh environment conditions such as shadow areas of a GSNN (Global Navigation Satellite System) or areas where the road facilities cannot be recognized.

However, Patent Literatures do not provide a path setting function of reflecting such a harsh environment condition.

Patent Literature 1: Korean Patent Registration No. 10-1907268 (Oct. 4, 2018; METHOD AND DEVICE FOR AUTONOMOUS DRIVING BASED ON PATH SELECTION)

Patent Literature 2: Korean Patent Registration No. 10-1581286 (Dec. 23, 2015; SYSTEM AND METHOD FOR TRACKING PATH TO AUTONOMOUSLY DRIVE UNMANNED VEHICLE)

SUMMARY OF THE INVENTION

The present disclosure has been made in an effort to solve the problems described above, and an objective of the present invention is to provide a system for generating an autonomous driving path using harsh environment information of an high definition map and a method thereof capable of avoiding harsh environment conditions, that disturbs the autonomous driving, in advance, so that it can be reflected in a path generation result.

According to one aspect of the present invention so as to accomplish these objects, there is provided to a system for generating an autonomous driving path using harsh environment information of an high definition map, including: a search extension determination unit including a data storage unit for storing data having high definition map data and autonomous vehicle information as data used for autonomous driving, and a search extension module that performs network search extension processing in the direction of tracking a road with a low search cost and avoiding harsh environment conditions; a search information generation unit for generating search extension information according to the performance of the search extension module; and a search result generation unit configured to generate an autonomous driving path based on the search extension information.

At this time, a weight is given to the road on which the harsh environment conditions exist when calculating the search cost.

In addition, the search extension module calculates a search cost of an alternative road when the harsh environment conditions exist on the road of the extended network and the alternative road exists in the process of extending the network while tracking the road with a low search cost; calculates a search cost of the corresponding road when the harsh environment conditions exist on the road of the extended network and there is no alternative road; and repeats the process of extending the network while tracking the road with a low search cost until it reaches the destination.

According to another aspect of the present invention so as to accomplish these objects, there is provided to a method for generating an autonomous driving path using harsh environment information of an high definition map, wherein a network search extension is processed using data including an high definition map and autonomous vehicle information; and a weight is given thereto during a calculation of a search cost in a case that harsh environment conditions exist in a road on the extended network.

At this time, the network search extension process includes: a network extension step of extending the network while tracking a road with a low search cost; a harsh environment condition determination step of determining whether harsh environment conditions exist in the road of the extended network; an alternative road existence determination step of determining whether an alternative road exists therein when the harsh environment conditions exist in the corresponding road; and a search cost calculation step of calculating the search cost of the alternative road when the alternative road exists therein and calculating the search cost of the corresponding road when the alternative road does not exist, wherein the network extension is repeated until it reaches the destination.

BRIEF DESCRIPTION OF THE DRAWINGS

The above and other objects, features and advantages of the present invention will be more apparent from the following detailed description taken in conjunction with the accompanying drawings, in which.

REFERENCE SIGNS LIST

Figure 1:
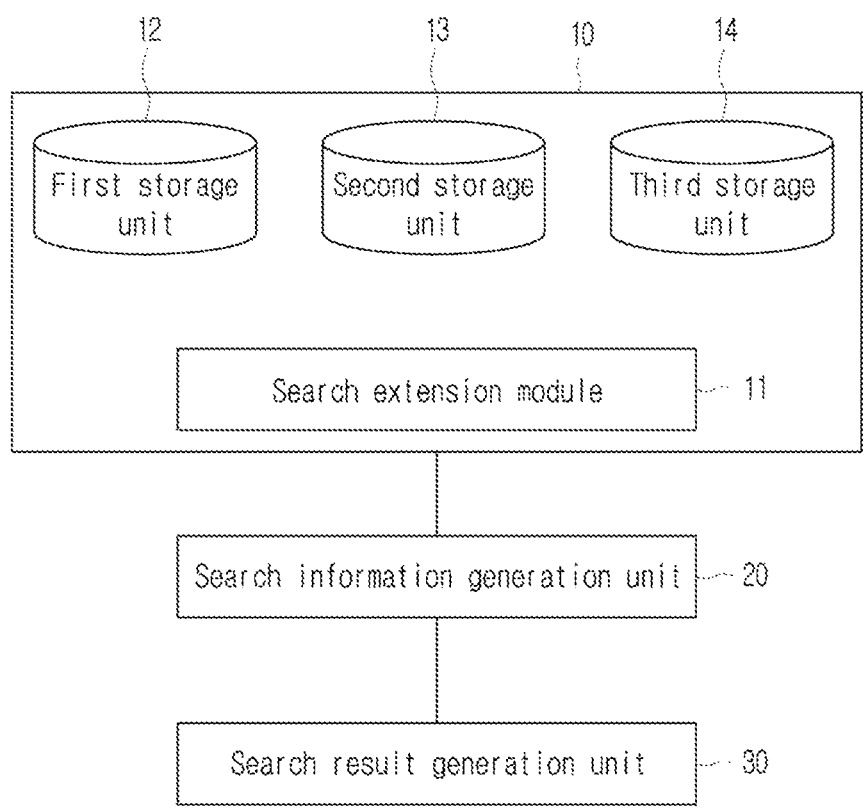
FIG. 1 is a block diagram illustrating a system for generating an autonomous driving path using harsh environment information of a high definition map according to the present invention.

10: search extension determination unit
11: search extension module
12 to 14: first to third storage unit
20: search information generation unit
30: search result generation unit

DETAILED DESCRIPTION OF THE PREFERRED EMBODIMENT

Hereinafter, a preferred embodiment according to the present disclosure are described in detail with reference to the accompanying drawings. It should be noted that the same components in the drawings are denoted by the same reference numerals as much as possible. In addition, the detailed description about the prior related technology will also be omitted when it is judged to blur the gist of this invention in explaining this invention.

FIG. 1 is a block diagram illustrating a system for generating an autonomous driving path using harsh environment information of a high definition map according to the present invention.

As shown in FIG. 1, the system for generating the autonomous driving path using harsh environment information of the high definition map according to the present invention includes a search extension determination unit (10), a search information generation unit (20), and a search result generation unit (30).

The search extension determination unit (10) includes a search extension module (11) for performing a network search extension processing and a data storage unit for storing data used for autonomous driving.

The search extension module (11) that performs the network search extension processing in a direction to track a road with a low search cost and to exclude and avoid the harsh environment conditions, and the detailed processing process will be described in detail with reference to FIG. 2.

The data storage unit includes a first storage unit (12) for storing high definition map data, a second storage unit (13) for storing navigation map data, and a third storage unit (14) for storing autonomous vehicle information.

The high definition map uses technologies such as 5G and artificial intelligence to increase the accuracy and speed of understanding road, so that temporary change situation information such as road information, road depression, and construction information is reflected in real time. The autonomous driving vehicle information includes driving information of the vehicle and sensing information of various sensors installed in the vehicle.

The search information generation unit (20) serves to determine whether the search extension is terminated or not and generate and manage search extension information according to the performance of the search extension module.

Here, the search extension information includes calculated cost, turn information, lane change information, and the like.

The search result generation unit (30) generates an autonomous driving path based on the search extension information.

Figure 2:
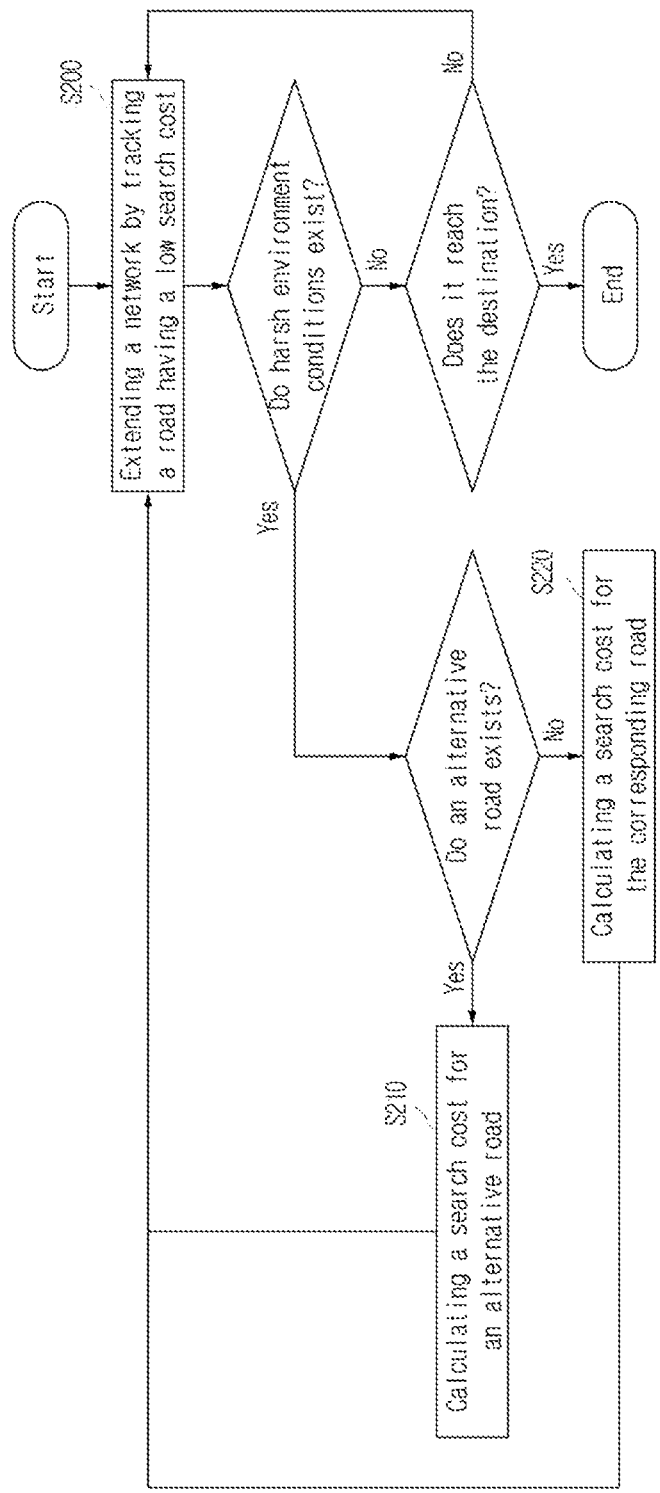
FIG. 2 is a flowchart illustrating a process in which a path search extension of reflecting harsh environment conditions is performed in a search extension module.

FIG. 2 is a flowchart illustrating a process in which a path search extension of reflecting harsh environment conditions is performed in the search extension module (11).

Referring to FIG. 2, the search extension module (11) performs a process of extending a network while tracking a road having a low search cost (S200). The network extension is repeated until it reaches the destination, and the cost is calculated for many links from the departure point to the destination and the network is extended in the form of tracking the road with the lowest search cost.

In this process, it is determined whether the harsh environment conditions exist on the extended network, that is, the specific road (link). Here, the harsh environment conditions may include conditions in which it is difficult to determine the location of the vehicle and conditions in which it is difficult to drive the vehicle.

First, the conditions in which it is difficult to determine the location of the vehicle include i) three-dimensional roads such as tunnels, underpasses, overpasses, and under overpasses and sections with high-rise buildings as a GSNN (Global Navigation Satellite System) shadow area, ii) sections where GNSS-RTK (Real Time Kinematic) correction information cannot be obtained, and iii) sections where the recognition of the road facilities is impossible due to weather conditions, surrounding vehicles, and obstacles.

In addition, the conditions in which it is difficult to drive the vehicle include: i) an intersection without a signal or an unprotected point, ii) a continuous turn section (right turn immediately after a left turn, left turn immediately after a right turn), iii) a narrow U-turn section or a sharp turn section, iv) accident sections, construction sections, and control sections (real-time information), v) roads with cleared lanes, and vi) school zones and silver zones.

If harsh environment conditions exist, it is determined whether an alternative road, that avoids the harsh environment conditions, exists therein. if the alternative road exists, a search cost for the alternative road is calculated (S210). The search cost is calculated in consideration of the length of the link and the width of the road and so on.

If there is no alternative road, the search cost of the corresponding road is calculated (S220).

When the cost is calculated in this way, it returns to the step S200 and extends the network while tracking a road with a low search cost. When it reaches the destination through this process, the search extension is terminated.

Figure 3:
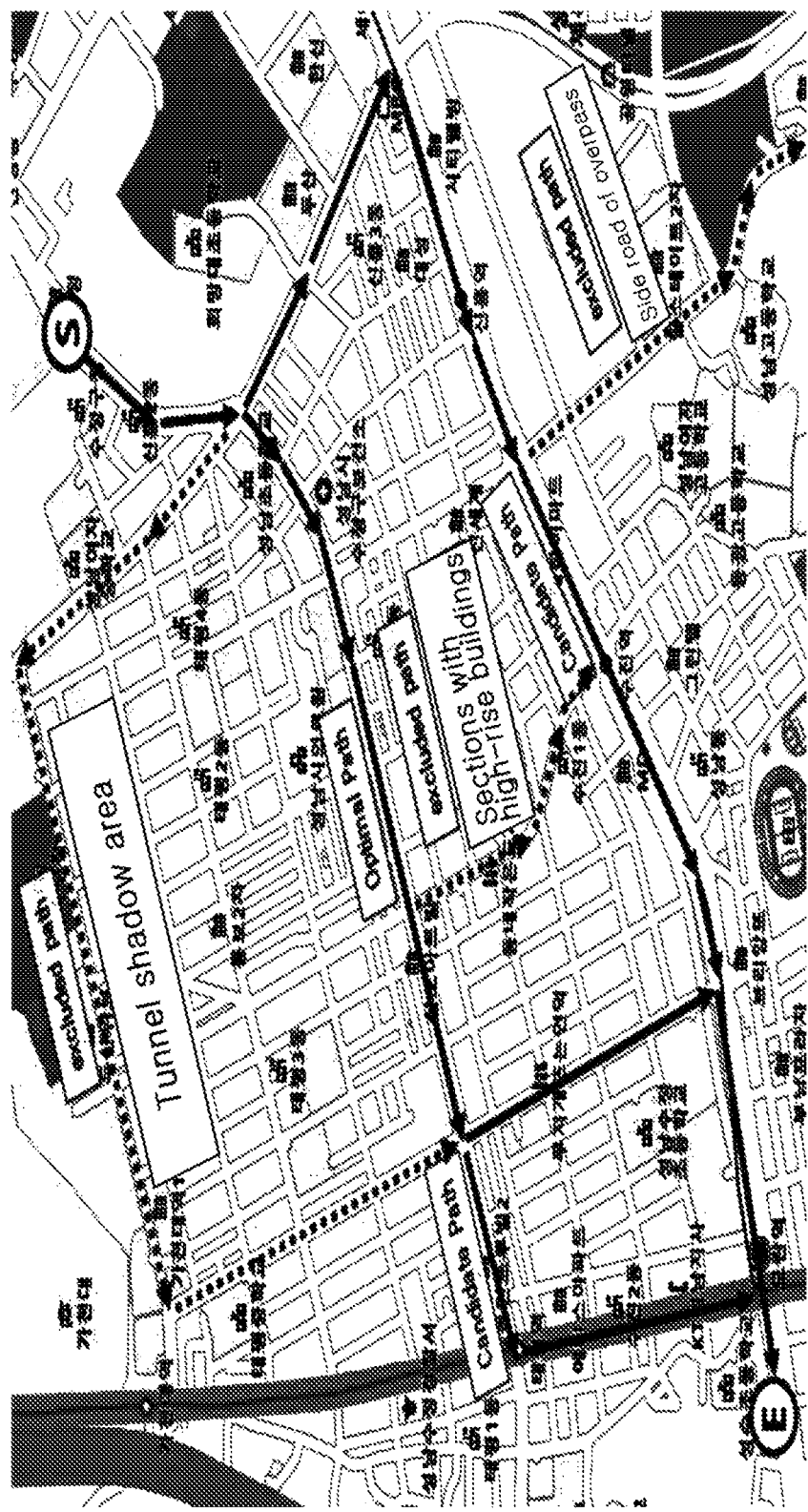
FIG. 3 is a diagram exemplarily illustrating several paths connecting a departure point and a destination.

FIG. 3 is a diagram exemplarily illustrating several paths connecting a departure point and a destination.

FIG. 3 illustrates several paths existing between the departure point (S) and the destination (E). In path setting for autonomous driving, the search cost is calculated for paths through a combination of links existing between the departure points and the destination, and a path with a low search cost is adopted. At this time, the search extension is performed by reflecting the harsh environment information in addition to the search cost.

In this case, with respect to the road including the harsh environment conditions, if the alternative road exists, the corresponding road may be avoided or a weight is given thereto, so that it is possible to make the cost higher when traversing the road that contains harsh environment conditions.

FIG. 3 exemplifies a form in which the roads including a tunnel shadow site, a high-rise building cluster, and a side road of overpass are set to be excluded from the path. Among the candidate paths that do not include the harsh environment conditions, the optimal path with the lowest cost may be set as the autonomous driving path.

According to the present invention as described above, safer autonomous driving is possible by setting a path that avoids the harsh environment conditions, which is a major obstacle to the autonomous driving, as a driving path, and thus it is expected to contribute to the spread of the autonomous driving technologies.

While the present invention has been described with respect to the specific embodiments, it will be apparent to those skilled in the art that various changes and modifications may be made without departing from the spirit and scope of the invention as defined in the following claims.

What is claimed is:

1. A system for generating an autonomous driving path using harsh environment information of an high definition map, comprising:
    a search extension determination unit including a data storage unit for storing data having high definition map data and autonomous vehicle information as data used for autonomous driving, and a search extension module that performs network search extension processing in the direction of tracking a road with a low search cost and avoiding harsh environment conditions;
    a search information generation unit for generating search extension information according to the performance of the search extension module; and
    a search result generation unit configured to generate an autonomous driving path based on the search extension information,
    wherein when the harsh environment conditions exist on the road of the extended network: identify one or more alternative roads that avoid the harsh environment conditions, calculate respective search costs for the alternative roads, and extend the network along a road with lowest search cost of the alternative roads.

2. The system according to claim 1, wherein a weight is given to the road on which the harsh environment conditions exist when calculating the search cost.

3. The system according to claim 1, wherein the search extension module
    calculates a search cost of an alternative road when the harsh environment conditions exist on the road of the extended network and the alternative road exists in the process of extending the network while tracking the road with a low search cost;
    calculates a search cost of the corresponding road when the harsh environment conditions exist on the road of the extended network and there is no alternative road; and
    repeats the process of extending the network while tracking the road with a low search cost until it reaches the destination.

4. A method for generating an autonomous driving path using harsh environment information of a high definition map, wherein
    a network search extension is processed using data including an high definition map and autonomous vehicle information; and
    a weight is given thereto during a calculation of a search cost in a case that harsh environment conditions exist in a road on the extended network,
    wherein the network search extension process comprises:
        when the harsh environment conditions exist on the road of the extended network, identifying one or more alternative roads that avoid the harsh environment conditions, calculating respective search costs for the alternative roads, and extending the network along a road with lowest search cost of the alternative roads.

5. The method according to claim 4, wherein the network search extension process comprises:
    a network extension step of extending the network while tracking a road with a low search cost;
    a harsh environment condition determination step of determining whether harsh environment conditions exist in the road of the extended network;
    an alternative road existence determination step of determining whether an alternative road exists therein when the harsh environment conditions exist in the corresponding road; and
    a search cost calculation step of calculating the search cost of the alternative road when the alternative road exists therein and calculating the search cost of the corresponding road when the alternative road does not exist,
    wherein the network extension is repeated until it reaches the destination.

* * * * *